Feb. 21, 1950     G. MONSEL     2,498,173
WHEEL AND AXLE MOUNTING FOR AGRICULTURAL MACHINES
Filed June 20, 1945
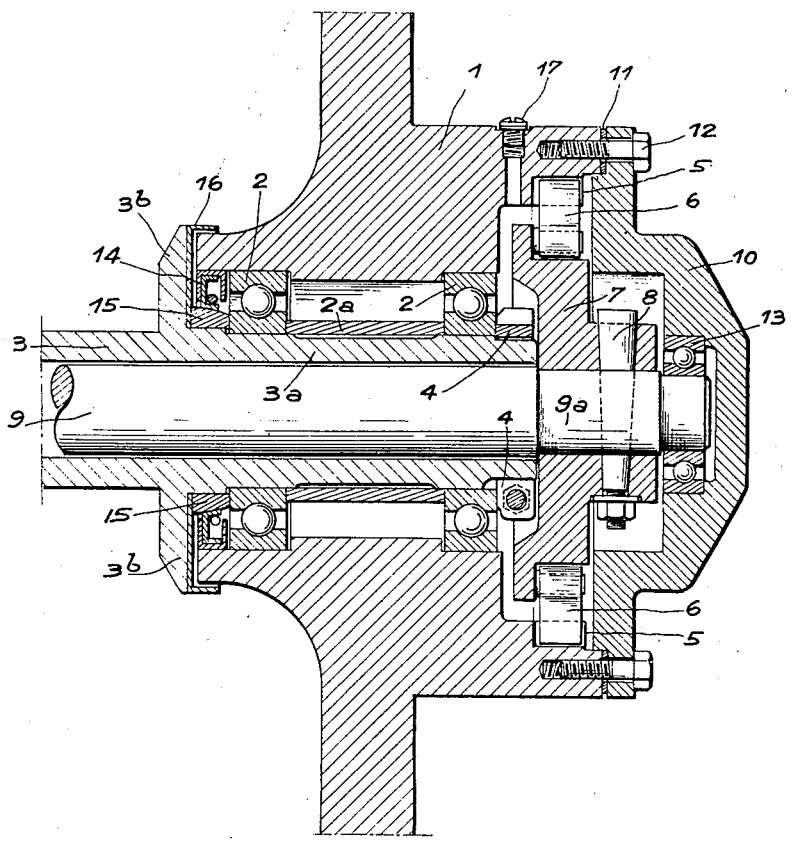
INVENTOR
Georges Monsel,
BY
ATTORNEY.

Patented Feb. 21, 1950

2,498,173

UNITED STATES PATENT OFFICE 2,498,173

WHEEL AND AXLE MOUNTING FOR AGRICULTURAL MACHINES

Georges Monsel, Montigny-Le-Roi, France

Application June 20, 1945, Serial No. 600,578
In France June 11, 1943

Section 1, Public Law 690, August 8, 1946
Patent expires June 11, 1963

3 Claims. (Cl. 74—13)

In the present mowers, the so-called "oil-bath mowers," the axle or main shaft supports the weight of the machine and, at the same time, transmits to the cutting mechanism the rotary motion received from the road wheels.

Said axle, made of untreated steel, revolves directly on the rolls or roller bearings which are arranged in the frame and lubricated by splashes of the oil contained in the central casing of the machine. An oil stopping gasket is provided at each end of the frame, near the wheels in order to prevent oil leaking by way of the axle but, after some service, owing to the loss of centering which the bearing assembly has undergone, said gasket is unable to fulfil its purpose and oil leakages occur.

In these machines, the axle rotates in the frame through the medium of roll bearings and, at each end, carries either the pawl housing, or pawl-carrier, or the cooperating ratchet wheel, while the road wheel, freely mounted on said axle end, is provided in a corresponding manner, either with a notched crown or with the pawl carrier. In this class of machines, some have no means for lubricating said one-way coupling transmitting the motion of the wheel to the axle, others are provided with such a lubricating means, but the latter has no relation with the means for oiling the axle in the frame. Hence, in the first case, the wear is high, while in the second, lubrication is imperfect and requires much attendance.

Beside the drawbacks which have been mentioned above, in a general way, owing to the fact that the axles carry the load, the traction, in running, is far from smooth and requires a substantial force, which increases with the wear; and the running speed cannot be increased without risks.

This invention has for its object a new wheel and axle mounting and implement drive for agricultural machines, more particularly for mowers, hay-makers and rakes, which remedies these various drawbacks by reducing the wear, avoiding the oil leakages and decreasing the tractive force required, said mounting having, besides, the advantage of insuring a smooth and progressive traction, as well as permitting, without any inconvenience, of more rapid motions being imparted to a tractor-driven machine.

To this end, the invention is mainly characterized in that the wheel hub is rotatably mounted, by means of two roll bearings, on a journal integrally connected with the frame, and is provided with a cover in which the axle end is supported and rotates freely on said journal, so that said axle does not carry the load.

In an embodiment applicable to mowers and haymakers the axle of which is in one part, said axle is supported by means of a roll bearing in the wheel cover and carries, between this bearing and the journal end, one of the elements of the one-way coupling, the other element of which is carried by the wheel hub.

Another important feature of the invention consists in that, on the side of the wheel opposite to the cover, the wheel hub is hermetically closed by means of an oil stopping joint, so that the assembly constitutes a fluid-tight housing adapted to contain oil in which the roll bearings, through the medium of which the road wheel is supported on the journal and, eventually, the roll bearings through the medium of which the axle rotates in the wheel cover and the pawl transmission or one-way coupling dip, said oil, which flows from the central casing, having access to said housing by passing round the axle inside said journal.

Other detail features will be apparent in the course of the following description of an embodiment of the invention, given only as an example, with reference to the accompanying drawing which represents a sectional view, through a plane containing the axis of the main shaft or axle, of an embodiment applicable to the mowers and hay-makers having a one-piece axle.

In the drawing, 1 is the wheel hub, rotating on ball or roll bearings 2, which are fitted therein and carried by a fixed journal 3a, formed by the end of the frame 3 or integrally connected therewith. A spacing sleeve 2a is slipped on the journal between the bearings, which are maintained by a nut or a locking collar 4.

In the hub 1, driving notches 5 are formed in which engage pawls 6, pivotally mounted in pockets of the pawl housing a pawl carrier 7, in the known manner. Said carrier is keyed, at 8, on the axle end 9a rotating freely in the journal 3a, and transmits to the axle the rotating motion imparted by the road wheel.

On the external side, the hub 1 is hermetically closed by a cover 10, a gasket 11 being tightened between the two parts by means of the securing screws 12.

Inside and at the centre of the cover 10 is mounted a roll bearing 13 supporting the end of the axle.

On the internal side, a removable oil stopping gasket 14 is fitted in the hub and bears with its inner flange on a ring 15 integrally connected with the journal 3. A flanged plate 16 resting upon a collar 3b of the journal protects the gasket 14 from the mud.

A drain plug 17 provided on the hub permits of removing the oil contained in the housing formed by said hub and its cover 10, previous to proceeding eventually to a dismounting of the latter.

The correct oiling is insured by oil splashes from the central casing (not shown) of the machine, said oil passing within the journal 3, round the axle 9.

It is obvious that, owing to this new arrangement, the axle will have no more to support the load. The roll bearing which usually supports the same in the frame, near the road wheel, in the mowers of the kind concerned, will be suppressed, as well as its oil stopping gasket.

Owing to the present invention, the axle, carrying no load and, hence, being only called to transmit torsion stresses, may be of reduced diameter. It will be constructed as a torsion rod, i. e. of a steel having some elasticity, which will insure a smooth and progressive traction, free from shocks. The traction speed, while running, may be increased without risks and, as a result, machines according to the invention will be more adapted to be drawn, by tractors, at higher speeds than hitherto.

Obviously, the invention is not limited to the described and shown embodiments and comprises all modifications thereof, and some detail arrangements may also be substantially varied.

What I claim is:

1. A wheel mounting and implement drive for an agricultural machine, comprising a hollow journal integrally connected with the machine frame, a wheel hub rotatably mounted on said journal, a cover closing the outer end of said wheel hub, an implement drive shaft passing freely through said hollow journal and having its end rotatably mounted in said cover, and a one-way coupling mechanism between said wheel and said drive shaft to drive said shaft from said wheel hub only when said wheel is rotated forwardly by the movement of the machine.

2. A wheel mounting and implement drive for an agricultural machine, comprising a hollow journal integrally connected with the machine frame, a wheel hub rotatably mounted on said journal, a cover closing the outer end of said wheel hub, an implement drive shaft passing freely through said hollow journal and having its end rotatably mounted in said cover, and a ratchet and pawl mechanism between said wheel and said drive shaft to drive said shaft from said wheel hub only when said wheel is rotated forwardly by the movement of the machine.

3. A wheel and implement drive mounting for an agricultural machine, comprising a hollow journal integrally connected with the machine frame, a wheel hub rotatably mounted on said journal, a cover closing the outer end of said wheel hub, an implement drive shaft passing freely through said hollow journal and having its outer end rotatably mounted in said cover, a pawl carrier keyed on said implement drive shaft, pawls pivotally mounted on said pawl carrier, and inwardly open notches in said wheel hub for engagement by said pawls to drive said shaft only when the wheel is rotated forwardly by movement of the machine.

GEORGES MONSEL.

REFERENCES CITED

The following references are of record in the file of this patent:

UNITED STATES PATENTS

| Number | Name | Date |
|---|---|---|
| 762,081 | McNulty | June 7, 1904 |
| 1,294,985 | Werts | Feb. 18, 1919 |
| 1,354,169 | Caldwell | Sept. 28, 1920 |
| 1,372,166 | White | Mar. 22, 1921 |
| 1,556,997 | Johnston | Oct. 13, 1925 |
| 1,582,246 | Buchanan | Apr. 27, 1926 |
| 1,842,971 | Hughes | Jan. 26, 1932 |
| 2,143,121 | Cox | Jan. 10, 1939 |
| 2,265,938 | Eksergian | Dec. 9, 1941 |
| 2,386,917 | Thornton | Oct. 16, 1945 |